United States Patent [19]

Weber

[11] Patent Number: 5,614,118
[45] Date of Patent: Mar. 25, 1997

[54] HOT PLATE WELDER WITH PIVOTABLY MOVABLE CARRIAGE UNIT

[76] Inventor: Wolfgang Weber, 27 Erie View Rd., Leamington, Ontario, Canada, N8H 4E8

[21] Appl. No.: 330,843

[22] Filed: Oct. 27, 1994

[51] Int. Cl.$^6$ ............... H05B 1/02; B23K 3/03
[52] U.S. Cl. ............ 219/243; 219/85.16; 219/85.19; 228/6.2; 269/56; 269/58
[58] Field of Search .................. 219/243, 85.1, 219/85.16, 85.19, 78.01, 69.2, 69.5, 388; 228/6.2; 156/514, 293, 322; 483/15–16; 324/71.1; 269/55, 56, 58

[56] References Cited

U.S. PATENT DOCUMENTS

| | | | |
|---|---|---|---|
| 2,684,775 | 7/1954 | Von Hofe | 156/322 |
| 3,448,911 | 6/1969 | Cushman | 219/85.1 |
| 3,791,018 | 2/1974 | Johnston et al. | 228/6.2 |
| 3,883,369 | 5/1975 | Badger et al. | 29/623.1 |
| 4,012,277 | 3/1977 | Lundskow et al. | 156/571 |
| 4,162,566 | 5/1979 | Magerle | 29/792 |
| 4,300,715 | 11/1981 | Keizer et al. | 219/85.1 |
| 4,500,768 | 2/1985 | Rossell | 219/85.1 |
| 4,507,168 | 3/1985 | Konaka | 156/499 |
| 4,573,627 | 3/1986 | Miller et al. | 228/180.2 |
| 4,851,648 | 7/1989 | Jacobs et al. | 219/85.16 |
| 4,894,506 | 1/1990 | Woerner | 219/85.16 |
| 4,982,890 | 1/1991 | Schuster et al. | 228/44.7 |
| 5,068,508 | 11/1991 | Phalon, Jr. et al. | 219/85.16 |
| 5,150,827 | 9/1992 | Fries | 228/55 |

FOREIGN PATENT DOCUMENTS 2091909  8/1982  United Kingdom.

Primary Examiner—John A. Jeffery
Attorney, Agent, or Firm—Riches, McKenzie & Herbert

[57] ABSTRACT

An apparatus for heat welding together thermoplastic components and work-pieces comprises a heating unit and a carriage unit. The heating unit is axially movable to contact and melt part of the work-piece to a sufficiently tacky state for the component to be fused thereto. The carriage unit releasably retains the component and is axially movable to move a component contact surface against the melted part of the work-piece, mounting the component thereto. The carriage unit is pivotally movable about the axis, whereby the initial contact of the component against a mis-aligned work-piece causes the component and the carriage unit to pivot so that the component contact surface is re-aligned with the melted part of the work-piece.

20 Claims, 6 Drawing Sheets

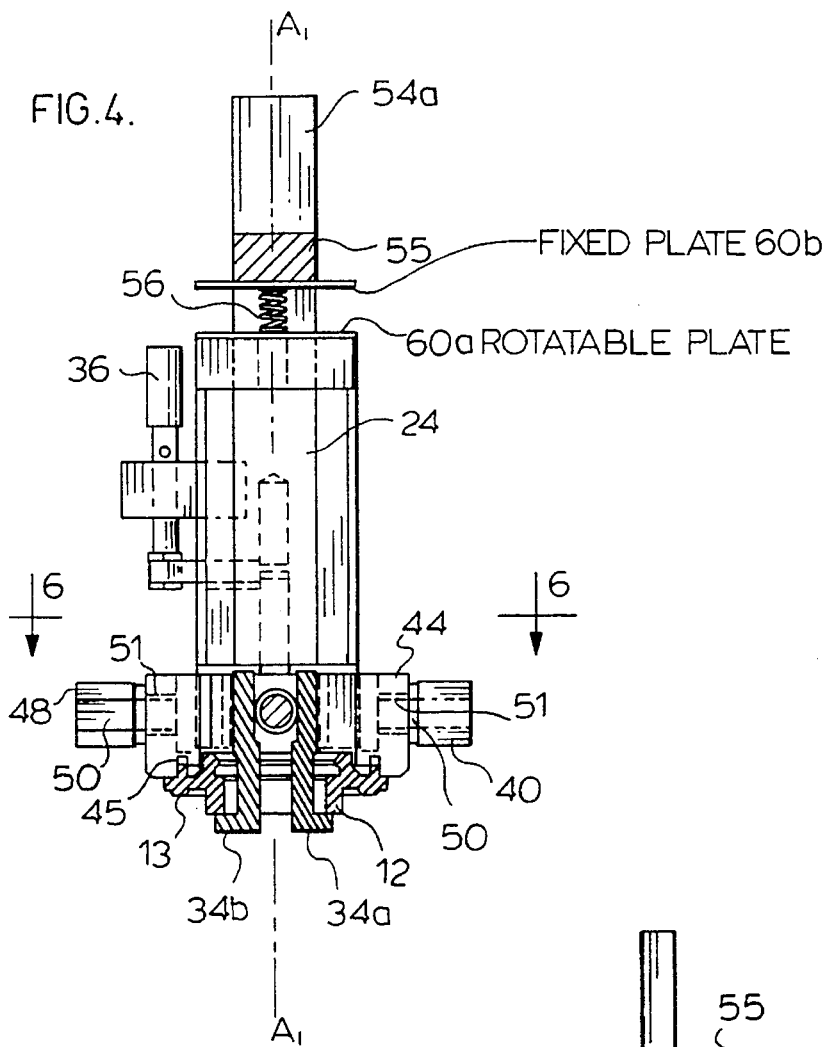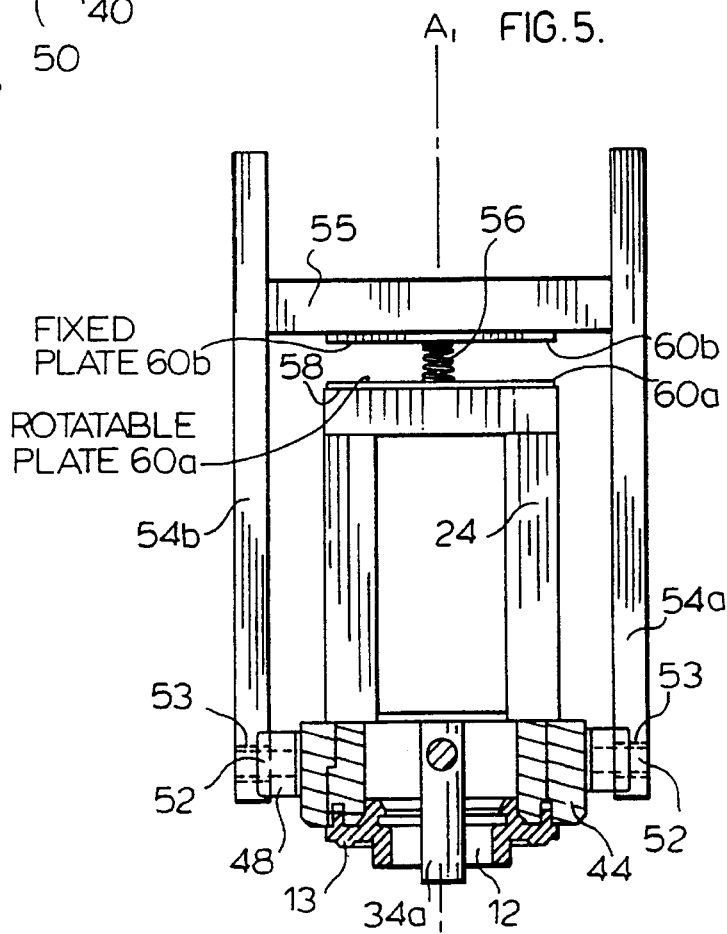

HOT PLATE WELDER WITH PIVOTABLY MOVABLE CARRIAGE UNIT

SCOPE OF THE INVENTION

The present invention relates to a hot plate welder used to heat weld together components and work-pieces made from thermoplastics or other heat fusable materials, and more particularly a welder which pivotally holds the component to be mounted, permitting its re-orientation into alignment with the surface of the work-piece to which it is to be attached.

BACKGROUND OF THE INVENTION

Various heat welding devices are known for fusing together weldable components and work-pieces. One known heat welding device incorporates a hot plate which by thermal contact melts part of the component and/or the work-piece to a tacky state, after which the component and workpiece are brought into physical contact and then cooled, fusing together to produce a finished article. Frequently, hot plate welders are used in the production of thermoplastic automobile parts, joining components, such as filler necks, brackets, vent nipples, blow pin plugs and the like, to fuel tanks, anti-freeze and windshield washer fluid reservoirs and other work-pieces.

Conventional hot plate welders include a vertically movable carrier or holding fixture and a heating unit. The holding fixture holds a component to be mounted in a fixed orientation moving it into contact with an upper surface of a work-piece. The heating unit heats and partially melts one or both of the contact surface of the component, namely the part of the component which is to be brought into sealing contact with the work-piece, and a portion of the upper surface of the work-piece where the component is to be attached. In use, the heating unit is activated to melt the respective portions of the component and work-piece. After the melting of the component and work-piece is complete, the holding fixture is moved lowering the component held thereby along a vertical axis aligned with the melted portion of the work-piece, until the melted contact surface to the component is brought into sealing contact against the melted portion of the work-piece.

In one known hot plate welder, the heating unit is movable both vertically along an axis into and from contact with the work-piece, as well as in a horizontal direction. The heating unit is provided with aligned upper and lower melting surfaces, the upper surface for engaging and melting the contact surface of the component, and the lower surface for engaging and melting the portion of the work-piece. In operation, the holding fixture with the component coupled thereto, the heating unit and the portion of the work-piece to which the component is to be attached are all axially aligned. The holding fixture is lowered to move the component against the upper melting surface of the heating unit, melting the contact surface of the component. The downward force of the component on the upper melting surface in turn biases the heating unit downwardly, moving the lower melting surface to contact and melt the work-piece. Once the component and the work-piece are sufficiently melted, the holding fixture and heating unit are both partially raised, and the heating unit is moved horizontally to a position clear of the holding fixture. The holding fixture is then again lowered to move the still melted contact surface of the component against the melted portion of the work-piece, fusing the component thereto.

A difficulty with conventional hot plate welders is that the requirement that both the work-piece melting surface and the component carrying or holding fixture move along an axis which is 90° to the surface of the work-piece. This necessitates precise and time consuming calibration of the welder to ensure that the surface of each separate work-piece is in the exact 90° orientation. With conventional hot plate welders, it is therefore not possible to simply change production lines to produce a different article, a difficulty which is particularly compounded where a number of different components are to be secured to a number of different locations on each single work-piece.

Another major difficulty with conventional hot plate welders is that they are most frequently used to secure components to work-pieces having uneven or non-uniform surfaces, particularly in the case of blow molded thermoplastic work-pieces. Blow molded work-pieces are frequently formed without uniform wall thickness and shape as a result of uneven shrinkage as the thermoplastic cools. The result is therefore that the surface of the individual work-pieces will vary in orientation, and after initial calibration of the welder, are unlikely to be precisely 90° to the axis of movement of each of the work-piece heating unit and the component carrier or holding fixture. As such when the heating unit engages the workpiece, there will be uneven contact, with the result that a portion of the work-piece may remain incompletely, or even entirely unmelted. When the melted component is moved against the work-piece, there is again uneven contact between the contact surface of the component and the unevenly melted portion of the work-piece, with the result that an incomplete weld may result which may later lead to the premature failure of the produced article.

A further disadvantage of conventional hot plate welders is that except in severe cases where an incomplete weld is visually apparent, there is no way for the operator to determine whether uneven welding has occurred, and if so, whether weld is outside acceptable tolerances so as to likely lead to failure.

Consideration has been given to providing an apparatus in which the work-piece heating unit, which contacts and melts the work-piece, is movable to a parallel orientation with the work-piece surface to be melted. The inventor has, however, appreciated a difficulty with such a structure in that while the work-piece may be evenly melted, the component remains fixed within the holding fixture. The result may therefore be that even more uneven sealing may occur as a result of the fixedly held component engaging an angularly melted surface.

SUMMARY OF THE INVENTION

Accordingly, it is an object of the present invention to at least partially overcome the disadvantages of previously known devices and provide an improved apparatus for heat welding components to work-pieces, wherein the component is movably held by the apparatus so as to permit its alignment with the surface of the work-piece to which it is to be secured.

Another object of the present invention is to provide an apparatus in which both the melting unit which engages the portion of the work-piece and the holding fixture which releasably carries the component are movable to assume an orientation substantially aligned with the surface of a blow-molded thermoplastic work-piece.

Another object of the invention is to provide an apparatus in which the angular orientation of the component as it is attached to the work-piece is recorded.

A further object of the invention is to provide a hot plate welding apparatus in which a modular heating unit and component carrying unit are provided, which simplify both initial set-up and customization for use in the production of different articles.

Accordingly, the present invention relates to an apparatus for heat welding together components and work-pieces which are formed of heat sealable materials, and primarily thermoplastic materials such as nylon, ABS, PVC, polypropylenes, polyethylenes and the like.

The apparatus is provided with a holding fixture which releasably holds and carries the component which is to be attached to the work-piece, and a heating unit for melting at least one of the portion of the work-piece onto which the component is to to be attached, or the surface of the component which is to sealingly contact the workpiece. The holding fixture is part of a carriage assembly used to mount the component on the work-piece, and may be in the form of two or more pneumatically operated telescoping arms or pins which engage the component, a vacuum suction unit, or any other suitable gripping device adapted to grasp and release the component, depending on its structure and function. The carriage assembly is movable to bring a component retained thereby to contact and bond with the corresponding portion of the work-piece. The carriage assembly is pivotably movable so that the component which is held thereby can move to an orientation aligned with the surface of the corresponding portion of the work-piece, thereby ensuring an even weld therewith. More preferably the carriage assembly is such that the component held thereby is free to pivot in any direction about a point as close to the work-piece surface as possible.

By the use of the present invention, the initial contact of the component against the work-piece advantageously results in the component re-orienting itself so that the contact surface of the component is moved to an orientation substantially parallel to and abutting the corresponding portion of the work-piece, minimizing the likelihood of an incomplete weld therebetween.

To ensure even melting of a work-piece having an uneven or misaligned surface, the heating unit may be provided with a reciprocally movable work-piece hot plate which moves into contact with and melts the portion of the work-piece, and which is also pivotable. Preferably the work-piece hot plate has a size and shape which is complementary to the contact surface of the component, and which is also free to pivot in any direction.

In use, on the initial contact of the hot plate against a misaligned work-piece surface, the hot plate pivots to re-orient itself into a position substantially aligned therewith, thereby ensuring even contact and melting of the work-piece. The complementary size and shape of the hot plate forming a corresponding melted portion of the work-piece to which the component is mounted. Once the portion of the work-piece has been melted to a sufficiently tacky state so that the component can be fused thereto, the work-piece hot plate is retracted away from the work-piece, and the heating unit is moved to a position where it will not hinder the mounting of the component by the carriage assembly. The component is then moved via the holding fixture so that the component contact surface is contacted against the still tacky melted portion of the work-piece. The carriage assembly may further be adapted to hold the component in sealing contact with the melted portion of the work-piece for a given period of time, and/or under a given pressure required for the component to fully fuse to the work-piece.

Preferably, a gimbal secured to a forward end of a movable arm or arm assembly is used to pivotally mount the carriage assembly. The movable arm being elongated along an axis and reciprocally movable therealong between a forward position where a component weld in the carriage assembly engages the work-piece, and rearward position where the arm is retracted and the component is spaced away from the work-piece. The gimbal characterized by concentric inner and outer rings, each centered about the axis and secured at the ends of gimbal support arms. The carriage assembly attached to the inner ring, with the inner ring being secured to the outer ring by a first pair of opposing pins, permitting the rotation of the inner ring thereabout within the outer ring. The outer ring being secured between the pair of gimbal support arms by a second opposing pair of pins, offset 90° from each of the first pins. The second pins secure the outer ring and permit its rotation thereabout between the support arms.

More preferably, the gimbal support arms extend parallel to the arm axis with the inner and outer rings attached to the support arms at their forwardmost ends. The use of the gimbal structure advantageously permits the component carried by the carriage assembly to pivot in any direction about a point on the arm axis as close to the surface of the work-piece as possible.

The apparatus may also be provided with a second component hot plate having a configuration which is complementary to the contact surface of the component, and which is provided to melt the component contact surface to a tacky state, and provide enhanced fusion with the corresponding melted portion of the work-piece. The component hot plate may be provided as a separate fixed hot plate, or alternately, as part of the movable heating unit.

BRIEF DESCRIPTION OF THE DRAWINGS

Further advantages and objects of the present invention will appear from the following description taken together with the accompanying drawings in which:

FIG. 4 is a cut away side view of the carriage unit used in the apparatus of FIG. 1 showing a component retained thereby;

FIG. 5 is a cut away front view of the carriage unit of FIG. 4;

DETAILED DESCRIPTION OF THE DRAWINGS

Figure 1:
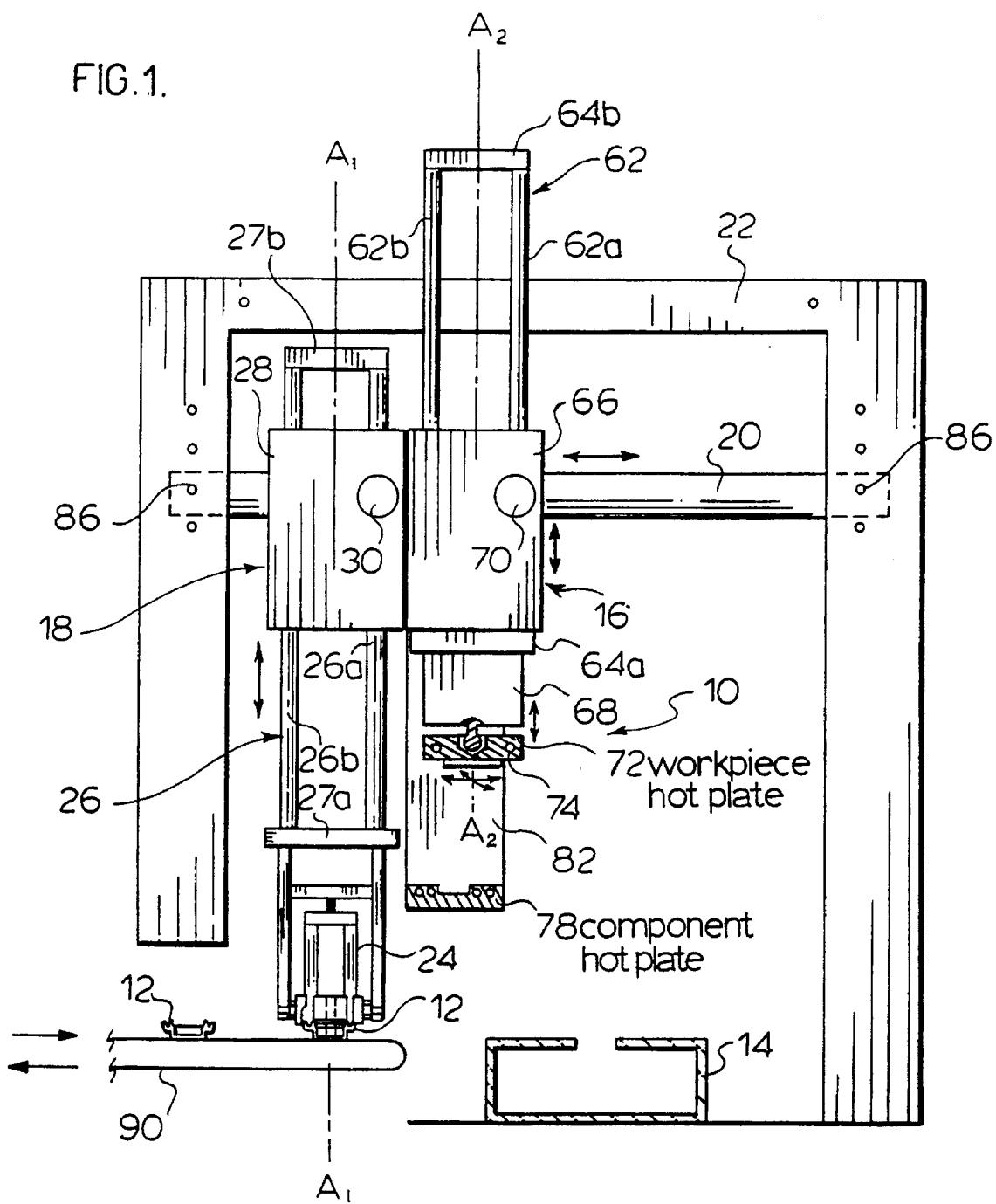
FIG. 1 is a perspective front view of an apparatus according to a preferred embodiment of the invention in a first indexed position.

Referring now to the drawings, there is shown in FIG. 1 a perspective illustration of a hot plate welder 10 used to mount a component 12 on a work-piece 14. The welder 10 includes a heating module 16 and a component carrier module 18, each of which is mounted for sliding movement between various work-stations along an elongated sliding track 20 mounted within a frame 22.

As will be described in detail hereafter, the heating module 16 and the carrier module 18 are indexed in movement along the sliding track 20 between a supply work-station where a component 12 is supplied to and initially retained by the carrier module 18; a melt work-station where part of the component 12 and work-piece 14 are heated and melted to a tacky state; and a mounting work-station where the component 12 is mounted on and fused to the melted portion of the work-piece 14.

The component carrier module 18 is used to retain, move and mount the component 12 on the work-piece 14, and includes a carriage unit 24, a movable arm assembly 26 and a carrier arm drive unit 28. The carriage unit 24 is positioned at the axial centre of a forwardmost end of the movable arm assembly 26 and is configured to grip and releasably retain a component 12. In the embodiment shown, the movable arm assembly 26 consists of two parallel spaced tubular support arms 26a, 26b joined at each end by perpendicularly extending cross-braces 27a, 27b. The support arms 26a, 26b pass through and are engaged into movement by the arm drive unit 28. The arm drive unit 28 is mounted on the sliding track 20 and includes a pneumatic actuator to both extend or retract the arms 26a, 26b, moving the carriage unit 24 forwardly or rearwardly along a central longitudinal axis $A_1$ of the arm assembly 26, parallel to the direction of elongation of arms 26a, 26b. An index drive mechanism 30 is also included within the drive unit 28 which engages and moves the entire carrier module 18 along the sliding track 20 between indexed positions.

Figure 6:
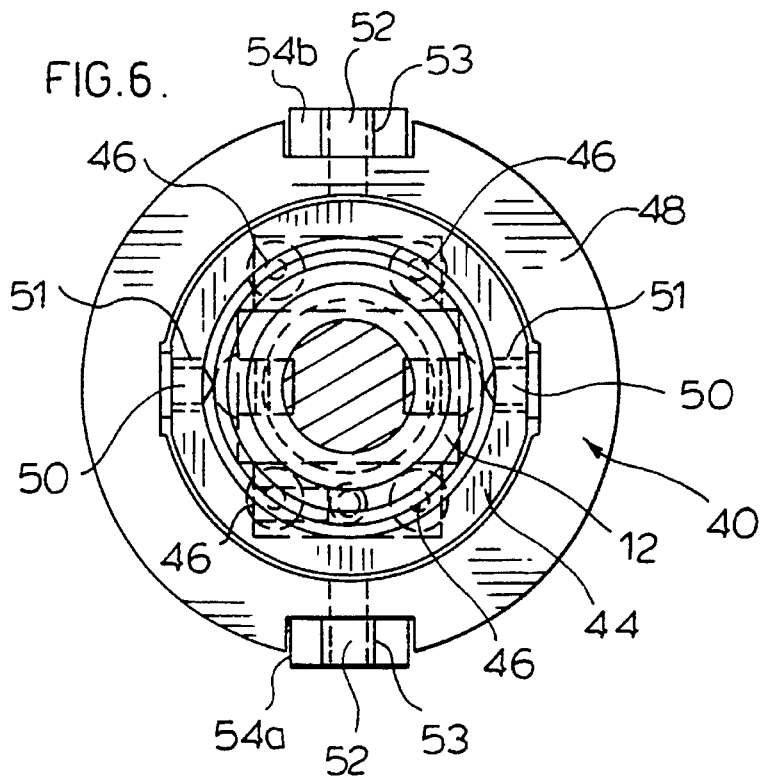
FIG. 6 is a schematic bottom view of the carriage unit of FIG. 4.

FIGS. 4 to 6 show best the carriage unit 24 as adapted to both grip and retain each component 12, while permitting pivotal movement of the component retained thereby about the axis $A_1$. The carriage unit 24 includes two pneumatically operated gripper arms 34a, 34b which are radially movable from the axis $A_1$ from a spaced together configuration to a spaced apart configuration wherein the arms 34a, 34b are radially outward from the axis $A_1$ to engage and couple the component 12 to the carriage unit 24. The gripper arms 34a, 34b are each provided with a hooked end sized to permit their insertion into or withdrawal from a cylindrical opening in the centre of the component 12 only when the arms 34a, 34b are in the spaced together configuration, and which when the component 12 is coupled to the carriage unit 24, do not block or otherwise interfere with the melting or sealing of the contact surface 13. The arms 34a, 34b are movable to couple and decouple the component 12 by the activation and deactivation of a pneumatically operated gripper 36.

The carriage unit 24 is housed within a gimbal 40 which is attached to a forwardmost surface of the cross-brace 27a. The gimbal 40 consists of a circular inner ring 44 which is concentrically positioned within a circular outer ring 48 and two spaced support arms 54a, 54b which extend from the forward cross-brace 27a parallel to support arms 26a, 26b. The support arms 54a, 54b are detachably coupled to the cross-brace 27a to permit the modular attachment of other components to the end of the arm assembly 26. Each of the rings 44,48 are axially centered with the longitudinal arm assembly axis $A_1$, with the inner ring 44 held in place within and concentric with the outer ring 48 by a first pair of aligned pins 50 extending from the outer ring 48 into complementary aligned bores 51 formed in the inner ring 44. The pins 50 act to retain the inner ring 44 while permitting its rotation thereabout within the outer ring 48. The outer ring 48 is rotatably held between the support arms 54a, 54b by a second pair of aligned pins 52 extending from the forward most ends of arms 54a, 54b into complementary aligned bores 53 formed in the arms 54a, 54b, such that the second pair of pins 52 is offset 90° from each of the first pins 50. The second pair of pins 52 thereby acting to retain the outer ring 48 while permitting its rotation thereabout between the arms 54a, 54b. A brace member 55 extends perpendicularly from support arm 54a to arm 54b between the carriage unit 24 and the cross-brace 26a to provide added support to the gimbal 40.

The carriage unit 24 is attached to the inner ring 44 so that the rotation of the rings 44,48 about the pins 50,52 moves a component 12 held by the carriage unit 24 pivotally about a point at the axial centre of the rings 44,48. The carriage unit 24 is secured to the circular inner ring 44 by bolts 46 so that the gripper arms 34a, 34b extend through the open centre of the ring 44 a sufficient distance to permit unhindered coupling of the component 12. The use of bolts 46 advantageously permits the modular replacement and substitution of the entire carriage unit 24 if the welder 10 is to be used to attach a different component requiring a different carriage unit 24.

A tensioned spring 56 extended along and aligned with the longitudinal axis $A_1$ is provided to assist in maintaining the rings 44,48 in a plane normal to the axis $A_1$. The spring 56 is attached at each respective end to a rearwardmost surface 58 of the carriage unit 24 and an axial centered point on the brace member 55. In the absence of load forces, the tension of the spring 56 acts to bias the carriage unit 24 into a normally axially aligned position, thereby maintaining the rings 44,48 in a coplanar configuration perpendicular to the axis $A_1$. As such, by increasing the spring tension 56, the use of the carrier module 18 of the present invention is not limited to vertical axial movement. By employing a stronger tensioned spring 56, the module 18 may be inclined relative to a vertical axis without concern that the component 12 will prematurely move out of the desired alignment as a result of the carriage unit 24 pivoting within the gimbal 40 simply under the forces of gravity. As is to be appreciated by the use of the gimbal 40, the carriage unit 24, and any component 12 which is held thereby are, on overcoming the bias of the spring 56, free to pivot in any direction about a point on the axis $A_1$ at the centre point of the rings 44,48.

The use of the present gimbal 40 is advantageous in that pivotal movement will occur about a point on the axis $A_1$ immediately adjacent the forwardmost end of the carrying module 18. As such the pivot point of the component 12 on initial contact with the work-piece 14 will be, practically speaking, as close as possible to the work-piece surface, maximizing the angle through which the component 12 can pivot with minimum lateral offset of component 12 in x-y direction.

Preferably, in an unbiased position, the carriage unit 24 is aligned with the axis $A_1$, and the component contact surface 13 is oriented in a plane perpendicular to the axis $A_1$. The component carrier module 18 additionally includes a pair of spaced induction plates 60a, 60b for providing an indication of the angular displacement of the carriage unit 24, and thereby the component 12, relative to the axis $A_1$. One induction plate 60a is positioned on the carriage unit rearwardmost surface 58, and the second other induction plate 60b is positioned on the forwardmost surface of the brace member 55. With the carriage unit 24 in a normally axially aligned position, induction plate 60a is spaced from and parallel to the induction plate 60b. The two opposing electrical plates 60a and 60b form four capacitors as plate 60a is connected to ground and plate 60b is divided into four equal segments. A change in distance between each section of plate 60b and ground (plate 60a) as a result of the carriage 24 being inclined causes a change in capacitance of each section. The change in capacitance provides the user with an indication of the angular orientation of the carriage unit 24 and thereby component 12.

More preferably, the arm drive unit 28 is provided with a load sensor (not shown) for sensing and outputting information relating to the rearward forces applied to the carriage unit 24, as for example occur on the movement of the component 12 against the work-piece 14.

The heating module 16 is used in melting the portion of a work-piece to a sufficiently tacky state so that the component 12 may be fused thereto. Module 16 includes a work-piece heating assembly 68, a second movable arm assembly 62 and a heater arm drive unit 66. The heating assembly 68 is secured to the centre of a forwardmost end of the second arm assembly 62, which, like the arm assembly 26, consists of a pair of parallel spaced elongated tubular support arms 62a, 62b which are joined at each end by perpendicular cross-braces 64a, 64b. The arm drive unit 66 is essentially the same as drive unit 28, and includes gearing to both extend and retract arms 62a, 62b to move the heating assembly 68 forwardly or rearwardly along a central longitudinal axis $A_2$ of the arm assembly 62, as well as an index drive mechanism 70 for moving the module 16 along the sliding track 20 between indexed positions.

Figure 7:
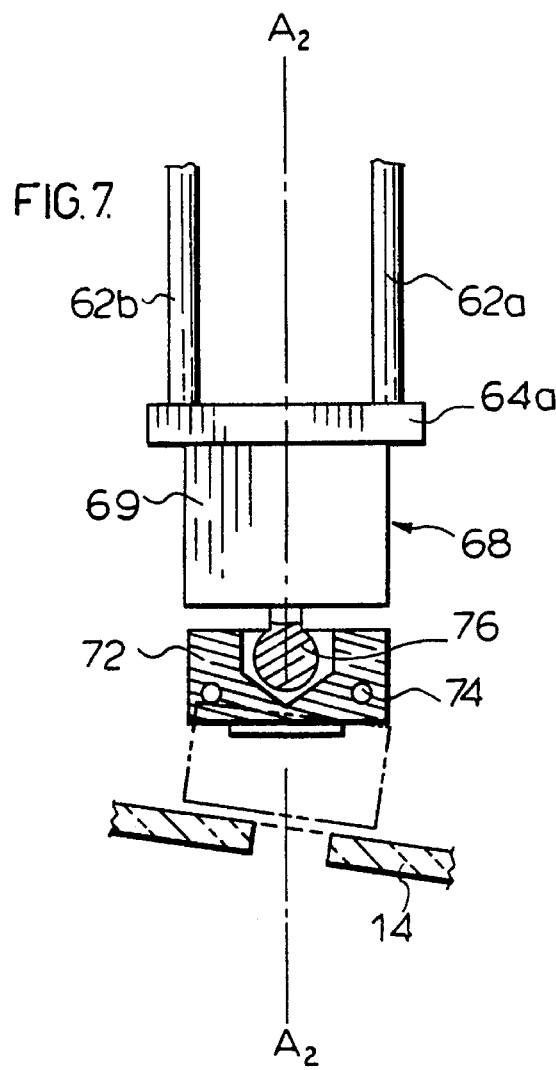
FIG. 7 is a schematic front view of the work-piece heating assembly for use in the apparatus of FIG. 1.

FIG. 7 shows the heating assembly 68 as including an Insulator 69 having pivotally attached to its forwardmost end, a hot plate 72 for contacting and melting a portion of the work-piece 14. The Insulator 69 prevents heat from hot plate 72 from being tansferred to arm assembly 62 and is detachably coupled to the forwardmost cross-brace 64a to enable the modular use of the arm assembly 62 and drive unit 66 with a carriage unit or other component.

The hot plate 72 is composed of an aluminum material having a series of cartridge heaters 74 embedded therein, which when electric current is supplied generate sufficient heat to melt a portion of the work-piece 14 contacted by the hot plate 72. The work-piece hot plate 72 is spaced from and pivotally coupled to the Insulator 69 by a universal joint 76, located in a position aligned with the longitudinal axis $A_2$ of the module 16, so that the hot plate 72 is free to pivot about the universal joint 76 in any direction. The work-piece hot plate 72 has a size and shape which is complementary to the surface of the component 12 which is to be sealed against the work-piece 14, so that by its use, the hot plate 72 melts a complementary portion of the work-piece. The work-piece hot-plate 72 is preferably detachably coupled to the universal joint 76, permitting simplified replacement and substitution of the hot plate 72 in the event a different shaped component 12 is to be attached. In the embodiment shown, the hot plate 72 is weighted so that under conditions where no load forces are applied to the hot plate 72, the contact surface of the hot plate 72 tends to assume an orientation which is normal to the axis $A_2$. It is to be appreciated, however, that other means of maintaining the unbiased positioning the hot plate 72, such as spaced compression springs disposed between the Insulator 69 and hot plate 72, may also be used.

The arm drive unit 66 is also provided with a load sensor which senses and outputs information relating to the rearward forces which are applied on the hot plate 72, as for example which occur on the hot-plate being moved against the work-piece 14.

Figure 3:
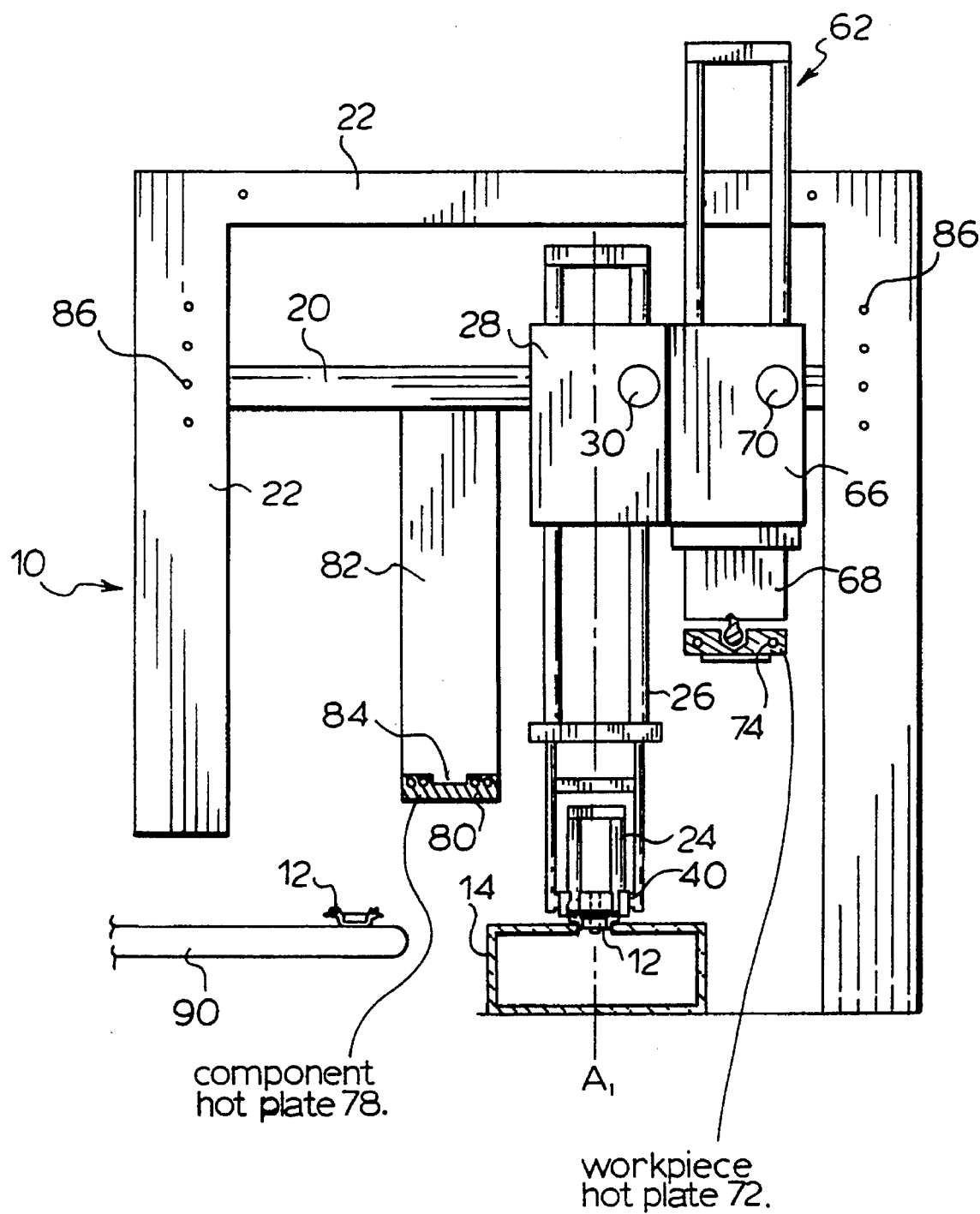
FIG. 3 is a perspective front view of the apparatus of FIG. 1 in a third indexed position.

FIG. 3 shows best the welder 10 as further including a component hot plate 78 which is mounted directly to the sliding track 20 by a brace member 82 As with the hot plate 72, hot plate 78 is formed of an aluminum material having embedded therein a number of electrically activated cartridge heaters 80. When current is supplied, the hot plate 78 generates sufficient heat to melt the component contact surface 13 which is to seal with the portion of the work-piece 14 which has been melted by the hot plate 72. The component hot plate 78 is positioned in an orientation generally normal to the direction of axial movement of the carriage unit 24. The brace member 82 is fixed to a forward edge of the sliding track 20, and extends in a direction generally parallel to the direction of extension of the support arms 26a, 26b. The brace member 82 supports the hot plate 78 in an orientation so that the heating surface is in a position generally parallel to the component contact surface 13 as it is held by the carriage unit 24, when moved with the axis $A_1$ aligned therewith. The heating surface of component hot plate 78 has a complementary profile to that of the contact surface 13, and as is to be appreciated, the hot plate 78 structure is dictated by the structure of the component 12. The hot plate 78 may therefore be provided with recesses or apertures 84 which otherwise prevent unwanted melting of peripheral portions of the component 12.

The entire sliding track 20 is preferably movably mounted on the frame 22, which by the selective placement of anchor bolts 86 enables the track 20 and modules 16,18 to be inclined relative to the work-piece 14. The ability to incline the track 20 advantageously permits axial alignment of carriage unit 24 and heating assembly 68 over surfaces of work-pieces which are not positioned within the welder 10 in a horizontal orientation.

Figure 2:
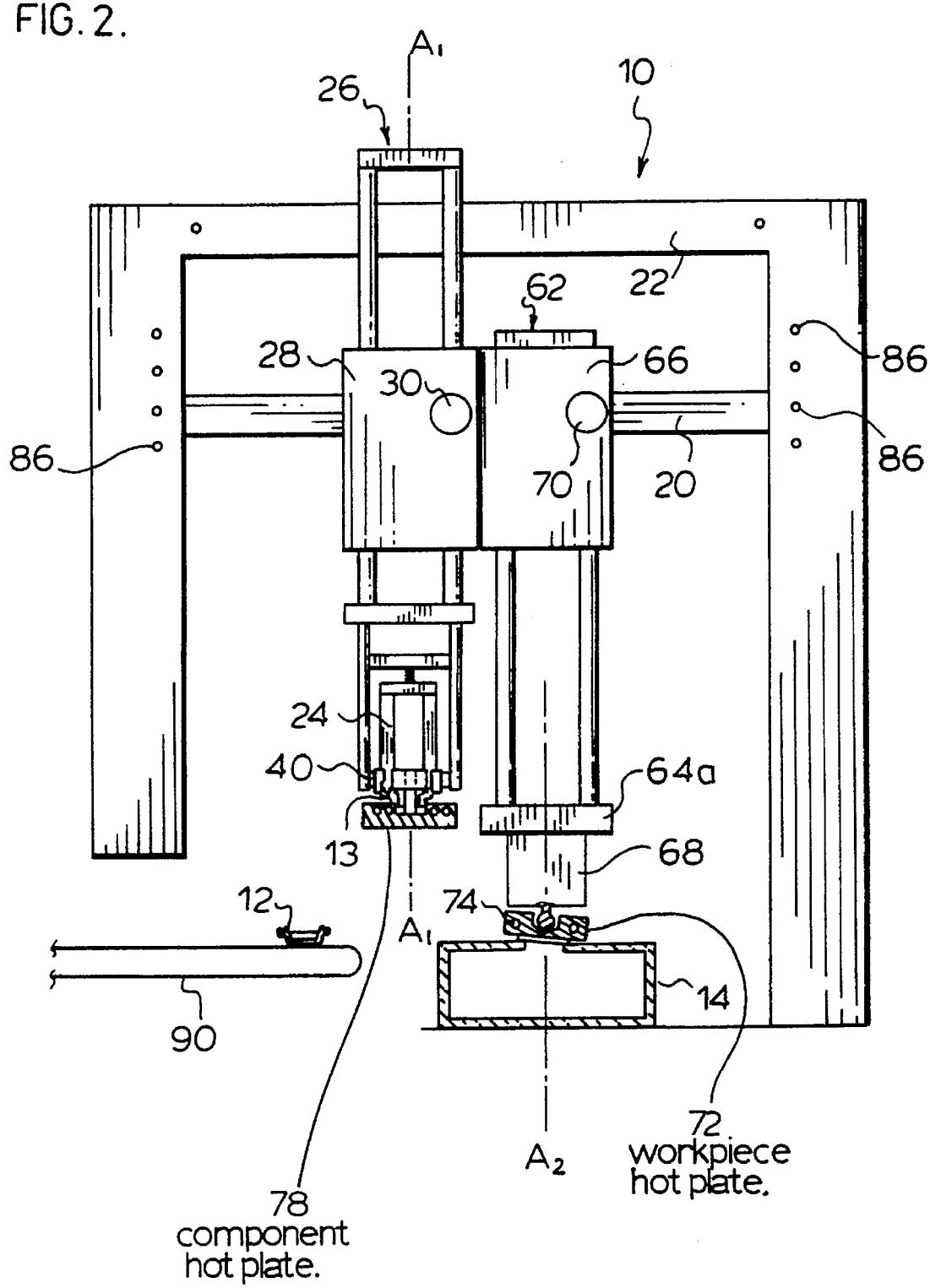
FIG. 2 is a perspective front view of the apparatus of FIG. 1 in a second indexed position.

The embodiment of the apparatus 10 shown in FIGS. 1 to 3 illustrates the invention as having a single heating module 16 and carrier module 18. It is to be appreciated, however, that the modular nature of welder 10 would equally permit a number of separate heating modules 16 and/or carrier modules 18 on the same sliding track 20 depending on the number of components 12 to be attached to the work-piece 14.

The use of the welder is best described with reference to FIGS. 1 to 3 wherein the heating module 16 and component conveyer module 18 are serially indexed together between the three work-stations shown.

A first work-piece supply work-station shown in FIG. 1, shows the welder 10, a thermoplastic work-piece 14 and a supply conveyor 90 which sequentially feeds cylindrical thermoplastic fitting components 12 to be mounted, to a ready position underneath and axially aligned with a carriage unit 24 moved to the supply work-station. In the work-station shown, each work-piece 14 is manually inserted and removed from the welder 10, however, in larger production runs, the work-piece 14 may also be supplied to the welder 10 by an index table.

On initial indexed movement to the supply work-station, both the carriage unit 24 and the heating unit 68 are in the fully retracted position wherein the support arms 26a, 26b and 62a, 62b are moved rearwardly by the associated drive units 28,66, so that the forwardmost cross-braces 27a, 64a are moved against the drive units 28,66, respectively. Each component 12 is retained by activating the drive unit 28 to move the support arms 26a, 26b forwardly, advancing the carriage unit 24 towards the component 12 aligned thereunder on the conveyor 90. The carriage unit 24 is advanced to move the gripper arms 34a, 34b through the open centre of the component 12 so that the component 12 abuts against a groove 45 formed in the inner gimbal ring 44. The pneumatic gripper 36 is next activated moving the arms 34a, 34b radially apart to the spaced configuration shown in FIG. 4, engaging the component 12 and coupling it to the carriage unit 24 in a position aligned with the axis $A_1$.

Once the component 12 is coupled to the carriage 24, the drive unit 28 is again activated to move the support arms 26a, 26b rearwardly, moving the carriage unit 24 together with the attached component 12 to the fully retracted position.

At the work-piece supply work-station, the heating unit 68 remains in a fully retracted non-working position as the component unit 24 is advanced and retracted. Current is supplied to the cartridge heaters 74 as required so that the hot plate 72 remains at a preset temperature.

Once the carriage unit 24, together with the component 12 coupled thereto, is returned to the retracted position, both drive mechanism 30 and drive mechanism 70 are activated to simultaneously move the respective carrier module 18 and heating module 16 along the sliding track 20 to the second melt work station shown in FIG. 2. Simultaneously with the movement of the module 18 to the second work station, the conveyor 90 is indexed to move the next component to a ready position in the welder 10.

In the second melt work-station, the component carrying module 18 is positioned along the sliding track 20 so that its axis $A_1$ is axially aligned with the component hot plate 78, and the heating module 16 is positioned on the sliding track 20 so that its axis $A_2$, and work-piece hot plate 72 are axially aligned with the portion of the work piece 14 to which the component 12 is to be attached.

With the component 12 aligned with the component hot plate 78, the arm drive unit 28 is activated to advance the support arms 26a, 26b, and axially move the component 12 so that the contact surface 13 abuts against the hot plate 78. As the heating surface of the hot plate 78 has both a complementary shape and is generally parallel to the component contact surface 13, the hot plate 78 evenly melts the component contact surface 13 to a tacky state.

The advance of arms 26a, 26b may be precalibrated to advance the component a preferred distance to the hot plate 78, or more preferably, may be variably set and controlled by the carrier module load sensor whereby when the load forces resulting from the contact of the component 12 against the hot plate 78 exceed a preset threshold level, the advance of the arms 26a, 26b is stopped. It is to be appreciated that the use of the load sensor advantageously eliminates timely recalibration of the welder 10 each time it is to be used with different sized components.

Simultaneously with the advance of the carriage support arms 26a, 26b, arm drive unit 66 is activated to advance the support arms 62a, 62b together with the associated heating assembly 68 towards the work-piece 14. The heating assembly 68 is moved forwardly along the axis $A_2$ until the hot plate 72 is moved into contact against and melts the portion of the work-piece 14 to which the component 12 is to be attached. As with the carrier module 18, the forward advance of the hot plate 72 may be controlled by either precalibrating the distance the support arms 62a, 62b are to be moved, or alternately, by the heating module load sensor controlling and limiting forward movement of the heating assembly 68 on sensing load forces exceeding a preset critical value.

As shown best in phantom in FIG. 7, if the portion of the work-piece to be melted is uneven or is not precisely 90° to the axis $A_2$ so that it is not parallel to the melting surface of the hot plate 72, the hot plate 72 re-orients to a position aligned therewith, ensuring even contact and melting. The initial contact between the hot plate 72 and an uneven portion of the work-piece 14 will typically occur along an off-centered edge portion of the hot plate 72, causing it to pivot about the universal joint 76, until the hot plate 72 repositions itself with the melting surface juxtaposed against the work-piece 14. Once so re-oriented, hot plate 72 evenly contacts the work piece 14 ensuring its even melting.

The component 18 is held in contact against the component hot plate 78, and the work-piece hot plate 72 is held in contact with the work-piece 14 for a sufficient period of time to melt the contacted surfaces to a sufficiently tacky state to permit their melt fusion together. It is to be appreciated that the independent operation of the drive units 28,66 enables different melting times for each of the component 12 and work-piece 14. It is thereby possible to heat weld components and work-pieces of differing materials and/or thicknesses where one of the component or the work-piece requires a longer melt-time than the other.

Once sufficient melting has occurred, both arm drive units 28,66 are activated to retract the respective arms 26a, 26b and 62a, 62b and return the associated carriage unit 24 and heating assembly 68 to the fully retracted position. The drive mechanism 30 and drive mechanism 70 are then again activated to index the respective carrying module 18 and the heating module 16 along the sliding track 20 to the third mounting work-station shown in FIG. 3.

In the mounting work-station, the component carrier module 18 is positioned so that its axis $A_1$ and the melted component contact surface 13 held by the carriage unit 24 are positioned in axial alignment with the melted portion of the work-piece 14. At the mounting work-station, the heating module 16 is moved to a non-working position where it will not interfere with the operation of the component carrier module 18.

Once at the third work-station, the arm drive unit 28 is activated to advance the support arms 26a, 26b and move the carriage unit 24 together with the component 12, along the axis $A_1$ towards the work-piece 14. As the melted contact surface 13 is moved against the corresponding melted portion of the work-piece 14, the pivotal attachment of the carriage unit 24 in the gimbal 40 ensures that the component 12 will re-orient itself so that the component contact surface 13 aligns itself with the melted portion of the work-piece 14, resulting in an even weld therebetween.

If the melted portion of the work-piece 14 is not parallel to the melted contact surface 13, the initial movement of the component 12 against the work-piece 14 results in an axial off-centered contact with the component. As the component 12 is advanced, the force of the off-centered contact becomes sufficient to overcome the bias of the spring 56 and pivot the carriage unit 24. The off-centered contact thereby results in the component 12 pivoting about the axial centre of the rings 44,48 until the component contact surface 13 re-orients itself into alignment with and against the melted portion of the work-piece 14.

As the component 12 pivots about the center of rings 44,48, it in turn inclines the carriage unit 24 relative the axis $A_1$, with the result that induction plate 60a is inclined relative to induction plate 60b. The relative change in spacing between the induction plates 60a, 60b produces an electrical signal indicative of the angle at which the component 12 is attached to the work-piece 14. By presetting a threshold relative angle of attachment, it is thereby possible to determine whether the produced article falls within acceptable tolerances or is likely to fail over time.

The carrier module 18 is configured to retain the component 12 against the work-piece 14 under sufficient force and for a sufficient length of time so that the melted portions of component 12 and work-piece 14 may cool sufficiently to fully fuse. As with the hot plate 72, the component 12 may be either moved against the work-piece 14 by preprogramming the drive unit 28 to advance the support arms 26a, 26b the required distance, or by automatically stopping the advance of the support arms 26a, 26b on the load sensor sensing the required force needed to ensure complete fusing of the component and work-piece. Preferably, the load sensor provides an output of the load forces applied in mounting the component 12 to the work-piece 14 which may be compared with a minimum load force required for proper fusion.

Once the fusing of the component 12 to the work-piece 14 is complete, the pneumatic gripper 36 is released moving the arms 34a, 34b to the spaced together position, and enabling their withdrawal from the component 12. The arm drive unit 28 is next activated to retract the arms 28a, 28b and move the carriage unit 24 to the fully retracted position, and the drive mechanisms 30 and 70 are then activated to simultaneously return the component carrying module 18 and the heating module 16 along the sliding track 20 to the first work-station for coupling the next component 12.

As is to be appreciated, while FIGS. 1 to 3 show a single component to be attached to a single location of the work-piece, the welder 10 may be used to attach a number of components at a number of different positions on the work-piece. Similarly, while a single horizontal sliding track 20 is shown, the hot plate welder 10 may be provided with a number of heating and component carrying modules on a number of separate sliding tracks positioned at differing angular orientations, depending on the components to be attached.

While the heating module 16 and component carrier module 18 have been disclosed as moving in tandem indexed movement, it is to be appreciated that the modules 16,18 may move independently both between and at various work stations depending on the thickness of the component and/or the work-piece and the degree of melting desired.

Figure 8:
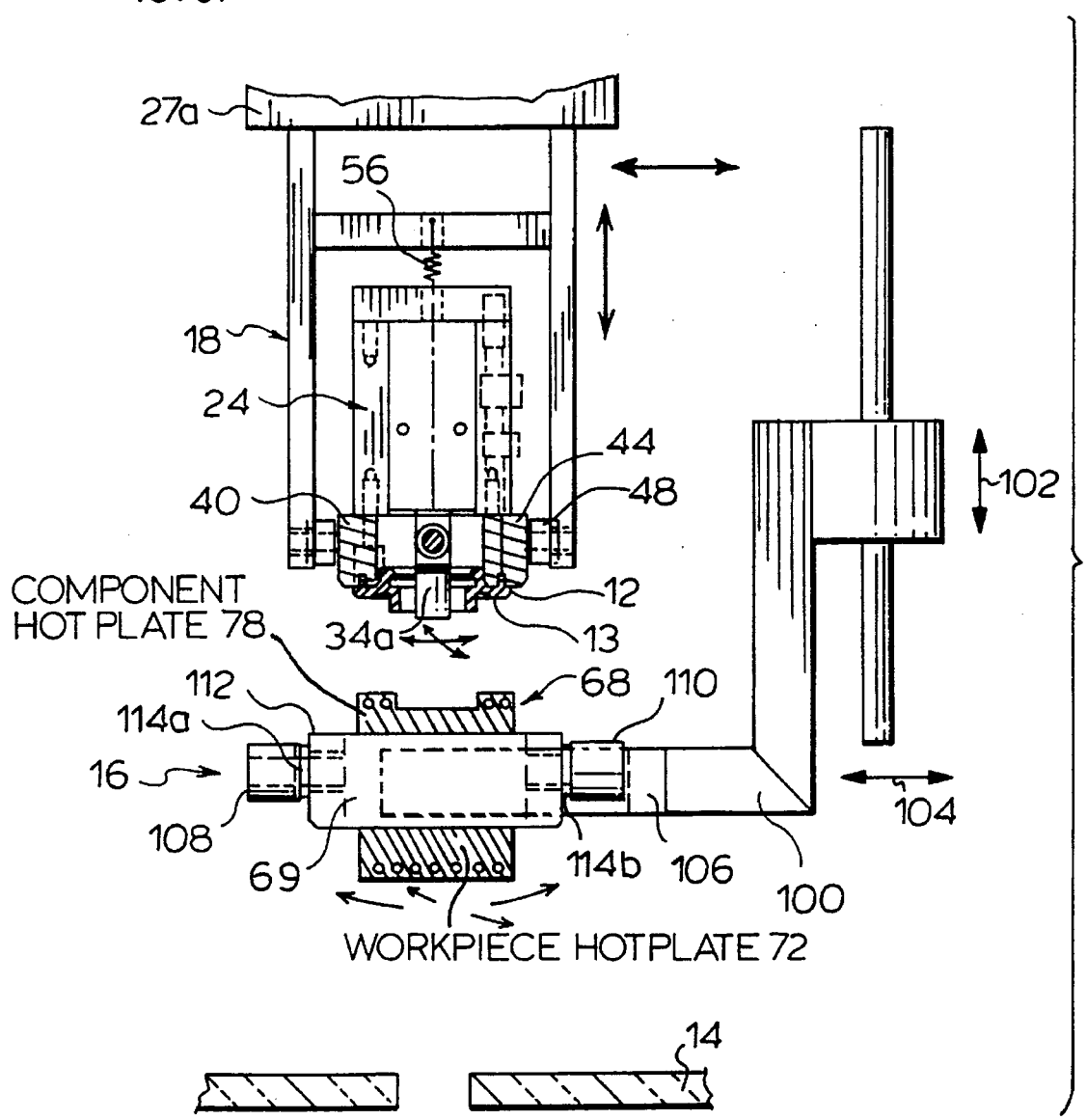
FIG. 8 is a partially cut away schematic view of the apparatus according to a second embodiment of the invention.

FIG. 8 shows a second embodiment of the invention wherein like reference numerals are used to identify similar components. The apparatus of FIG. 8 includes a component carrying module 18 mounted on a sliding track (not shown) which are essentially identical in structure to that shown in FIG. 1. A heating module 16 is provided, which includes a heating assembly 68 slidably mounted to the sliding track by an "L"-shaped support arm 100 which is movable both axially in the direction of arrow 102, towards and away from the work-piece 14, as well as transversely to the axial direction in the direction of arrow 104 along the sliding track.

The heating assembly 68 includes an insulator 69, a work-piece hot plate 72 and a component hot plate 78 fixedly secured to a rearward end of the insulator 69. The component hot plate 78 is essentially the same as that shown in FIG. 1 and has an upper melting surface with a complementary profile to that of a component contact surface 13. The heating assembly 68 is pivotally secured between a forked end portion 106 of the arm 100 by a gimbal 108 which permits pivotal movement of the insulator 69, the component hot plate 78 and the work-piece hot plate 72 as a single unit. The gimbal 108 comprises an outer ring 88 rotatably secured between the forks of the end portion 106 by a pair of pins (not shown). A smaller inner ring 112 is rotatably secured within the ring 110 by a second pair of pins (114a, 114b) offset 90° from the first pins, in the same manner as gimbal 40. The insulator 69 is mounted within the ring 112 whereby the contact of the hot plate 72 with the work-piece 14 enables the pivotal movement of the heating assembly 68 within the gimbal 108 to move the contacting surface of hot plate 72 into juxtaposition with the surface of the work-piece 14.

In use, hot plates 72 and 78 are heated via cartridge heaters 74 and the temperature is regulated to a preset value. The component carrier module 18, having a component 12 releasably coupled thereto in the manner described with reference to FIGS. 1 to 7, is positioned in axial alignment with the portion of work-piece 14 to which the component 12 is to be attached. The heating assembly 68 is then moved by sliding arm 100 along direction 104 to a position where the assembly 68 is in axial alignment between the carriage unit 24 and the work-piece 14, as shown in FIG. 8. With both the hot plates 72,78 activated, the carriage unit support arms (not shown) are then advanced to move the carriage unit 24 axially towards the work-piece 14, bringing the component contact surface 13 against the component hot plate 78. The contact of the component contact surface 13 with the hot plate 78 melting the contact surface 13 to a partially tacky state.

The force applied by the carriage unit 24 and the component 12 against the hot plate 78 simultaneously biases the heating assembly 68 in the axial direction towards the work-piece 14, moving the work-piece hot plate 72 against and melting the portion of the work-piece 14. In a similar manner to that previously described, on the hot plate 72 contacting an uneven or misaligned work-piece surface, the uneven contact with the hot plate 72 causes it to pivot about the axial center of the ring 112 to re-orient itself in alignment with the work-piece surface.

It is to be appreciated that as the work-piece hot plate 72 inclines relative to the axis, so does the component hot plate 78. The inclination of the hot plate 78 thus provides an off-center force on the contact surface 13, moving the component 12, and thereby the carriage unit 24 within the gimbal 40. The result is the reorientation of the contact surface 13 to a position aligned with the surface of the work-piece, with the surface 13 evenly contacting the hot plate 78.

After sufficient melting of the component 12 against the hot plate 78, and the work-piece 14 by the hot plate 72, the carrier module support arms are retracted to move the carriage unit 24 axially away from the work-piece 14. The heating assembly 68 is then moved first axially away from the melted portion of the work-piece 14, by moving the arm 100 in the direction 102. The arm 100 is then moved transversely relative to the axis in direction 104, to move the assembly 68 a position where it will not interfere with the coupling of the component 12 to the work-piece 14.

Once the heating assembly 68 is moved out of the way, the carriage unit support arms are again advanced to move the melted component contact surface 13 against the melted portion of the work-piece 14. As with the first embodiment, the carriage unit 24 is housed within a gimbal 40. On initial contact with the melted portion of the work-piece 14, the component 12 is free to pivot about the radial centre of the inner ring 44 to orient itself in a position with the contact surface 13 juxtaposed and abutting the surface of the work-piece 14, and a uniform heat weld is achieved.

In the manner described with the embodiment shown in FIG. 1, the carriage unit 24 holds the component 12 against the work-piece 14 for a sufficient time and under sufficient pressure for the component 12 and the work-piece 14 to fuse. Once fusion is completed, the gripper arms 34a, 34b are moved to release the component 12. The support arms are then retracted to move the carriage unit 24 clear of the completed article and a next component is releasably coupled to the carriage unit 24 for attachment to a next work-piece.

It is to be appreciated that by permitting pivotal movement of the component on initial contact with the work-piece, the requirement of ensuring precise alignment between the component contact surface and the work-piece is eliminated. While the preferred embodiments disclose a gimbal for pivotally housing the carriage unit, and either a universal joint or gimbal for pivotally attaching the work-piece hot plate, the invention is not restricted to these preferred embodiments. Other means of pivotal attachment including simple hinges, ball and socket joints and the like may also be used and will now become apparent.

While the invention describes and shows preferred embodiments of the invention, it is to be appreciated that the invention is not so limited. Other modifications and variations will now become apparent to persons skilled in this art. For a definition of the invention, reference may be made to the appended claims.

We claim:

1. An apparatus for heat welding a component to a work-piece, the apparatus comprising:

heating means for melting one of a contact surface of said component which contacts and seals with said work-piece, and a portion of said work-piece, carriage means for mounting said component on said work-piece after said one of said contact surface and said portion of said work-piece has been melted, the carriage means releasably coupling the component thereto and being movable along an axis between a rearward position wherein the contact surface is spaced from said portion of said work-piece and a forward position wherein said contact surface engages and bonds with the portion of the work-piece;

the carriage means being pivotable in any direction about a point on said axis substantially adjacent said portion of said work-piece. whereby the engagement of said contact surface with said portion of said work-piece re-positions the component by pivoting with the carriage means to an orientation wherein the contact surface is substantially aligned with said portion of said work-piece.

2. An apparatus as claimed in claim 1 wherein the heating means includes a first melting surface for melting said portion of said work-piece, the heating means being movable along said axis between a first position wherein said first melting surface is spaced from said portion of said work-piece and a second position wherein said first melting surface engages and melts said portion;

the first melting surface being pivotable about a point on said axis whereby the engagement of the first melting surface with said portion of said work-piece re-orients the first melting surface to a position substantially aligned with said portion of said work-piece.

3. An apparatus as claimed in claim 2 further comprising a second melting surface for melting the contact surface of said component, said carriage means being movable to urge the component contact surface into engagement with the second melting surface prior to engagement of the contact surface with the melted portion of the work-piece.

4. An apparatus as claimed in claim 3 wherein said heating means is movable in a direction transverse to said axis between a position wherein the first melting surface is axially aligned with the portion of the work-piece to be melted, and a position wherein said heating means is moved out of axial alignment therewith, and the carriage means is movable in a direction transverse to said axis between a position where the component contact surface is axially aligned with said melted portion of the work-piece and a position wherein said contact surface is moved out of axial alignment, therewith.

5. An apparatus as claimed in claim 4 wherein the heating means and the carriage means are configured for simultaneous indexed movement in said transverse direction from a first position wherein said first melting surface is axially aligned with said portion of said work-piece and said contact surface is positioned out of axial alignment therewith, and a second position wherein said first melting surface is positioned out of axial alignment with said portion of the work-piece and said component contact surface is aligned therewith.

6. An apparatus as claimed in claim 3 wherein said carriage means and said heating means form respectively part of a first module having a first arm member and a second module having a second arm member, said apparatus further comprising guide means for guiding in transverse movement each of said first module and said second module, said carriage means mounted on said first arm member, and said heating means mounted on said second arm member, said first and second modules being movable along said guide means to move said respective carriage means and first melting surface into and out of axial alignment with said portion of said work-piece, each of said arm members being axially movable towards and away from said portion of the work-piece, to move the associated carriage means and heating means into and from engagement with the work-piece.

7. An apparatus as claimed in claim 6 wherein said guide means is movable to an inclined position relative to said work-piece, said apparatus further including resilient biasing means for resiliently biasing said carriage means to an initial position relative to said axis prior to the engagement of said component with said portion of said work-piece.

8. An apparatus as claimed in claim 6 wherein the component and the work-piece are made from thermoplastics.

9. An apparatus as claimed in claim 6 wherein said carriage means is housed within a gimbal mounted to said first arm member, said component is pivotable in said gimbal about a point at the forwardmost end of said first module.

10. An apparatus as claimed in claim 3 further comprising mounting means for mounting said carriage means, said mounting means including an arm member and a gimbal, said carriage means being housed for pivotal movement in said gimbal, with said gimbal being mounted to a forward end portion of said arm member for movement therewith, said arm member axially movable in a forward direction to advance said carriage means towards said work-piece.

11. An apparatus as claimed in claim 3 further including melt pressure sensing means for sensing the axial force of the first melting surface against the work-piece, and component pressure sensing means for sensing the axial force of the component contact surface against the melted portion of the work-piece.

12. An apparatus as claimed in claim 3 wherein said carriage means is movable between a component supply work station wherein said carriage means is positioned to receive in a coupled relation said component, a component melt work station wherein said component contact surface is positioned for axial movement into contact with the second melting surface, and a component mounting work station wherein the said component is positioned for axial movement of said contact surface into engagement with the melted portion of the work-piece.

13. An apparatus as claimed in claim 1 further comprising mounting means for mounting said carriage means, said mounting means including an arm member and a gimbal, said arm member axially movable in a forward direction towards said work-piece, said carriage means being housed for pivotal movement in said gimbal, with said gimbal being mounted to a forward end portion of said arm member for movement therewith.

14. An apparatus as claimed in claim 1 wherein the component and the work-piece are made from thermoplastics.

15. An apparatus for heat welding a component to a work-piece, the apparatus comprising:

heating means having a first melting surface for melting a portion of said work-piece, a second melting surface for melting a contact surface of said component which contacts and seals with said work-piece, carriage means for mounting said component on said work-piece after said portion of said work-piece has been melted, the carriage means releasably coupling the component thereto and being movable along an axis between a position wherein the contact surface is spaced from said portion of said work-piece and a position wherein said contact surface engages and bonds with the melted portion of the work-piece;

the carriage means being pivotable about a point on said axis whereby the engagement of said contact surface with said portion of said work-piece re-positions the component by pivoting with the carriage means to an orientation wherein the contact surface is substantially aligned with said portion of said work-piece, the heating means being movable along said axis between a first position wherein said first melting surface is spaced from said portion of said work-piece and a second position wherein said first melting surface engages and melts said portion;

the first melting surface being pivotable about a point on said axis whereby the engagement of the first melting surface with said portion of said work-piece re-orients the first melting surface to a position substantially aligned with said portion of said work-piece, said carriage means being movable to urge the component contact surface into engagement with the second melting surface prior to engagement of the contact surface with the melted portion of the work-piece, mounting means for mounting said carriage means, said mounting means including an arm member and a gimbal, said carriage means being housed for pivotal movement in said gimbal, with said gimbal being mounted towards a forward end portion of said arm member for movement therewith, said arm member axially movable in a forward direction to advance said carriage means towards said work-piece, and measuring means for measuring the angular displacement of the component relative said axis when said component is mounted to said portion of said work-piece.

16. An apparatus as claimed in claim 15 wherein the measuring means comprises a pair of spaced induction plates, a first one of said induction plates secured to said forward portion of said arm member, and the second other of said induction plates secured to an adjacent portion of said carriage means, and whereby the pivotal movement of the carriage means on the repositioning of the component moves the second induction plate relative to the first to generate an electric signal.

17. An apparatus as claimed in claim 15 further comprising mounting means for mounting said carriage means, said mounting means including an arm member and a gimbal, said carriage means being housed for pivotal movement in said gimbal, with said gimbal being mounted to a forward end portion of said arm member for movement therewith, said arm member axially movable in a forward direction to advance said carriage means towards said work-piece.

18. An apparatus for heat welding a component to a work-piece, the apparatus comprising:

heating means having a first melting surface for melting a portion of said work-piece, a second melting surface for melting a contact surface of said component which contacts and seals with said work-piece, carriage means for mounting said component on said work-piece after said portion of said work-piece has been melted, the carriage means releasably coupling the component thereto and being movable along an axis between a position wherein the contact surface is spaced from said portion of said work-piece and a position wherein said contact surface engages and bonds with the melted portion of the work-piece;

the carriage means being pivotable about a point on said axis whereby the engagement of said contact surface with said portion of said work-piece re-positions the component by pivoting with the carriage means to an orientation wherein the contact surface is substantially aligned with said portion of said work-piece, the heating means being movable along said axis between a first position wherein said first melting surface is spaced from said portion of said work-piece and a second position wherein said first melting surface engages and melts said portion;

the first melting surface being pivotable about a point on said axis whereby the engagement of the first melting surface with said portion of said work-piece re-orients the first melting surface to a position substantially aligned with said portion of said work-piece, said carriage means being movable to urge the component contact surface into engagement with the second melting surface prior to engagement of the contact surface with the melted portion of the work-piece, and between a component supply work station wherein said carriage means is positioned to receive in a coupled relation said component, a component melt work station wherein said component contact surface is positioned for axial movement into contact with the second melting surface, and a component mounting work station wherein the said component is positioned for axial movement of said contact surface into engagement with the melted portion of the work-piece, said heating means being adapted for indexed movement between a work-piece melt station wherein said first melting surface is positioned for axial movement into contact with said portion of said work-piece, and an inactive station wherein said heating means is positioned out of axial alignment with said portion of said work-piece, wherein when said carriage means is positioned at said component melt station, said heating unit is positioned at said work-piece melt station to simultaneously engage and melt said portion of said work-piece, and when said carriage means is positioned at the mounting work station, said heating unit being positioned at said inactive station.

19. An apparatus as claimed in claim 18 further comprising mounting means for mounting said carriage means, said mounting means including an arm member and a gimbal, said carriage means being housed for pivotal movement in said gimbal, with said gimbal being mounted to a forward end portion of said arm member for movement therewith, said arm member axially movable in a forward direction to advance said carriage means towards said work-piece.

20. An apparatus as claimed in claim 18 further including melt pressure sensing means for sensing the axial force of the first melting surface against the work-piece, and component pressure sensing means for sensing the axial force of the component contact surface against the melted portion of the work-piece.

* * * * *